United States Patent
Leibenhaut et al.

(10) Patent No.: US 8,861,714 B1
(45) Date of Patent: Oct. 14, 2014

(54) HOLDER FOR HAND-HELD ELECTRONIC COMMUNICATION DEVICE

(71) Applicants: Leonard M. Leibenhaut, Middletown, CT (US); Paul Santarsiero, Avon, CT (US)

(72) Inventors: Leonard M. Leibenhaut, Middletown, CT (US); Paul Santarsiero, Avon, CT (US)

( * ) Notice: Subject to any disclaimer, the term of this patent is extended or adjusted under 35 U.S.C. 154(b) by 0 days.

(21) Appl. No.: 14/207,976

(22) Filed: Mar. 13, 2014

(51) Int. Cl.
*H04M 1/00* (2006.01)
*H04M 1/04* (2006.01)
*H04M 1/05* (2006.01)

(52) U.S. Cl.
CPC . *H04M 1/04* (2013.01); *H04M 1/05* (2013.01)
USPC .......................... 379/449; 379/446; 455/575.6

(58) Field of Classification Search
USPC ............... 379/449, 446, 455, 454; 455/575.1, 455/575.6, 90.3; D14/138
See application file for complete search history.

(56) References Cited

U.S. PATENT DOCUMENTS

| | | | |
|---|---|---|---|
| 4,878,237 A * | 10/1989 | Cianflone | ................... 455/556.1 |
| 5,457,745 A | 10/1995 | Wang | |
| 6,535,606 B2 * | 3/2003 | Cox | ................................ 379/449 |
| D548,457 S | 8/2007 | Reinerio | |
| 8,412,289 B1 | 4/2013 | Oh | |
| 8,428,665 B1 | 4/2013 | Crome et al. | |
| 8,596,412 B1 | 12/2013 | Jorgensen | |
| 8,616,327 B1 | 12/2013 | Palacios | |
| 2002/0009195 A1 | 1/2002 | Schon | |
| 2007/0045495 A1 | 3/2007 | Asano et al. | |
| 2007/0223745 A1 | 9/2007 | Eaton et al. | |
| 2007/0293277 A1 * | 12/2007 | Bury | ........................... 455/569.2 |
| 2008/0268793 A1 | 10/2008 | Nelson et al. | |
| 2009/0184145 A1 | 7/2009 | Yeh | |
| 2010/0072334 A1 * | 3/2010 | Le Gette et al. | ........... 248/176.3 |
| 2012/0024619 A1 | 2/2012 | Lin | |
| 2012/0027237 A1 | 2/2012 | Lin | |
| 2012/0037783 A1 | 2/2012 | Alexander et al. | |
| 2012/0312936 A1 | 12/2012 | Huang | |
| 2013/0048413 A1 | 2/2013 | Patzer | |
| 2014/0003021 A1 | 1/2014 | Bury | |

FOREIGN PATENT DOCUMENTS

EP          0775609 A1    5/1997
KR       101278259 B1    6/2013

* cited by examiner

*Primary Examiner* — Tuan D Nguyen
(74) *Attorney, Agent, or Firm* — Ira S. Dorman

(57) ABSTRACT

The holder for a hand-held electronic communication device is lightweight and comprises a perforated faceplate and a base of ergonomic form symmetrically constructed for ambidextrous, hand-held use, shoulder support, and surface support in both portrait and landscape orientations. The faceplate incorporates two clamping mechanisms, one being operative for fixing its gripping part in selected positions of extension from the faceplate and the other dynamically adjusting to position its gripping part for cooperatively clamping the communication device therebetween. A peripheral gasket on the front of the faceplate cushions and positionally stabilizes the mounted device, and is formed to promote the projection of sound waves from under the mounted device. The base may have holes and/or an internal acoustic baffle to further promote the projection of sound waves from its cavity, and holes in the faceplate and/or the base may enhance aesthetic attributes.

29 Claims, 10 Drawing Sheets

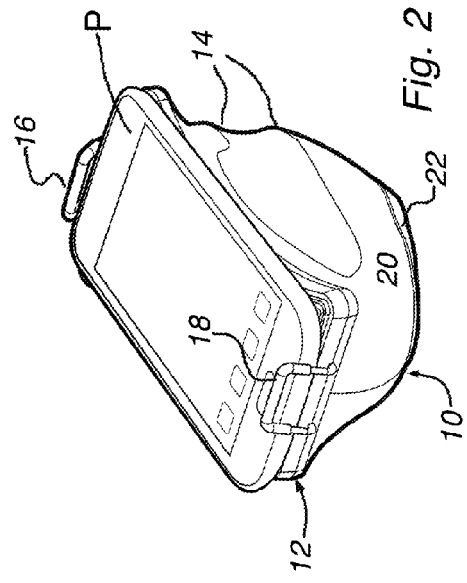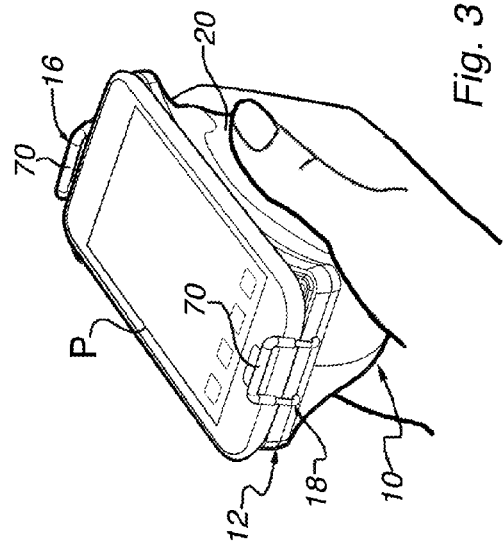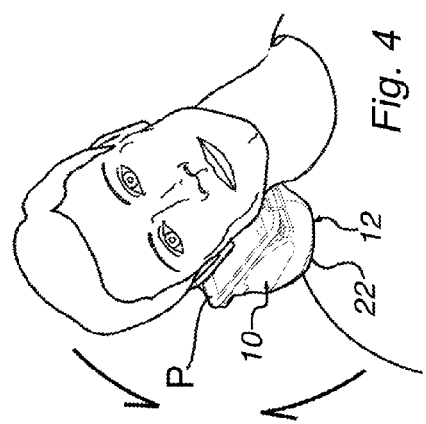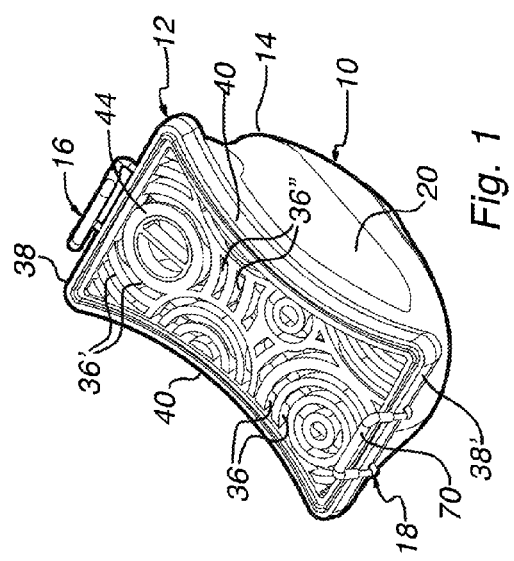

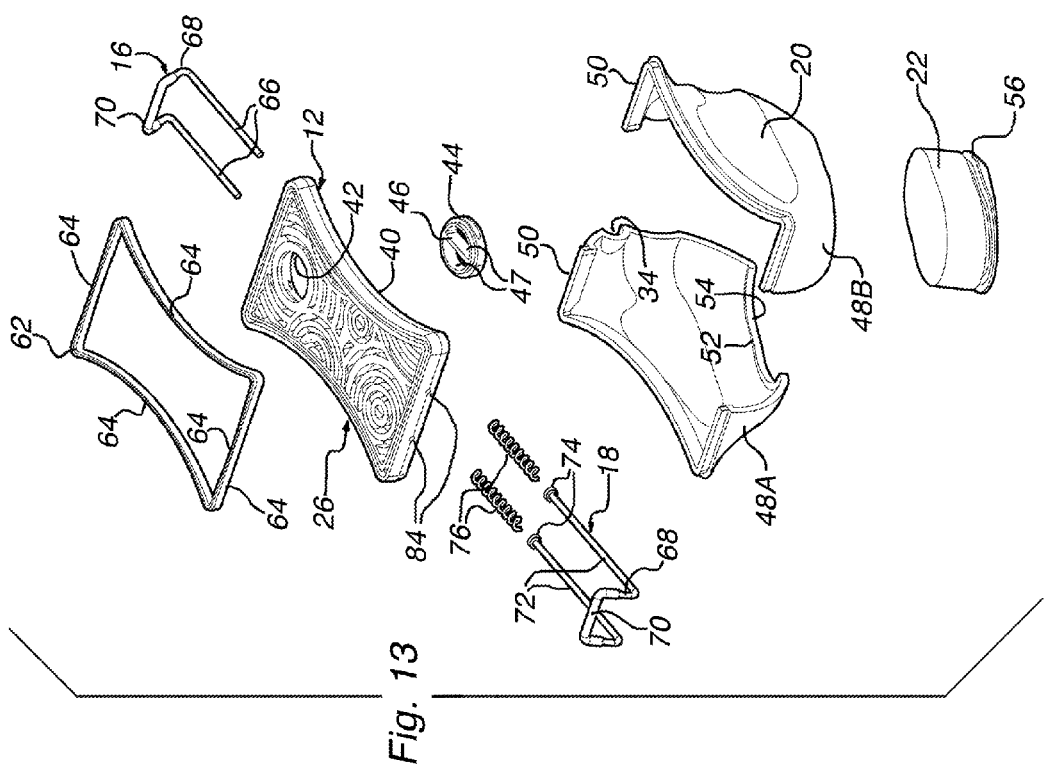

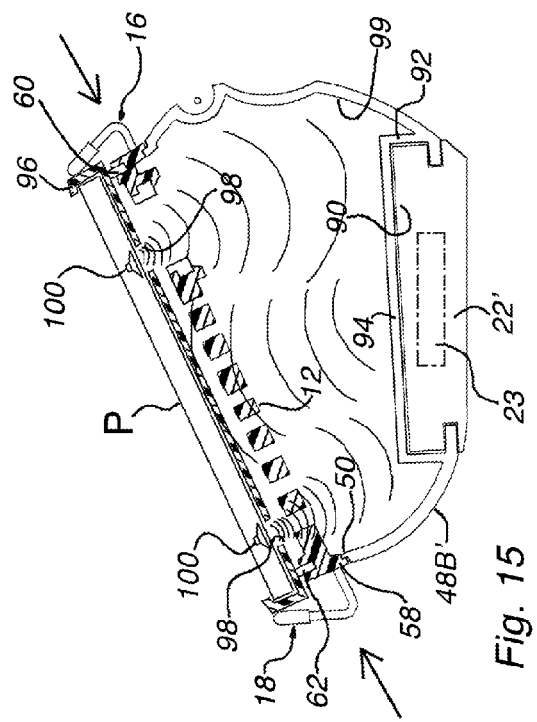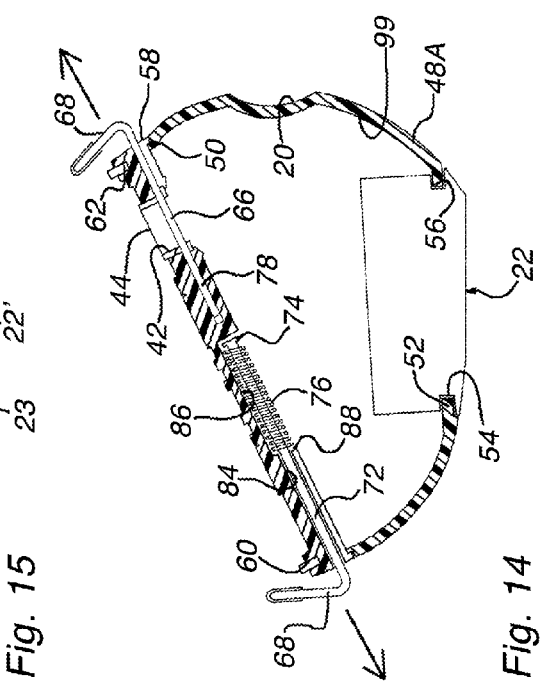
Fig. 14
Fig. 15

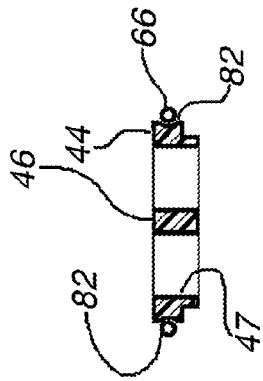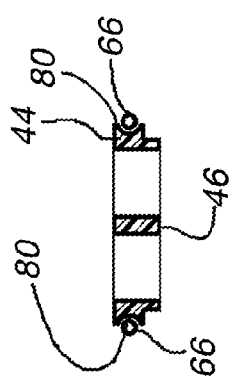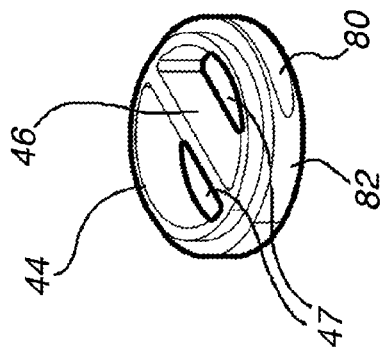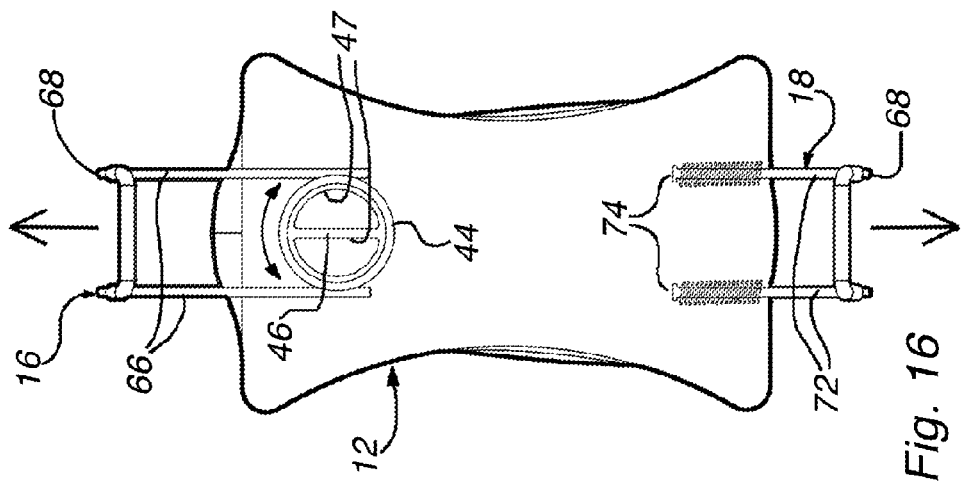

HOLDER FOR HAND-HELD ELECTRONIC COMMUNICATION DEVICE

BACKGROUND OF THE INVENTION

Smartphones and similar hand-held electronic communication devices are now globally ubiquitous and provide numerous, well-recognized commercial and social benefits. Such devices are characterized by being of flat, thin form (typically measuring, in inches, about 4⅞ by 2-14 by 5/16), which is beneficial in some respects but does as well entail features that are less than entirely desirable from certain standpoints.

More particularly, when used manually smartphones (and as employed herein that term is intended to encompass analogous hand-held electronic communication devices) are normally held by the edges with the thumb and fingers, which is not entirely comfortable and may produce considerable fatigue during conversations of extended duration; this is so even when the smartphone is contained in a protective, cushioning case, as it often is. Smartphones may of course also be used simply by laying them on a flat, underlying surface, but placement may not be stable under some circumstances and often support on a structural surface is simply not feasible.

Devices for holding smartphones and the like have been provided in the past but, as far as it is known, any prior holders that have enabled hands-free support and utilization of the telephonic (i.e., speaking and listening) aspects of the communication device have required speakerphone, Bluetooth, and/or microphone-incorporating headset supplemental connectivity. Moreover, such hands-free utilization alternatives are not always optimal from one or more standpoints: e.g., speakerphone use is compromised by background noise and lack of privacy; headset use is compromised by tangled cords and interruption of conversation while being plugged in; Bluetooth utilization has been minimally adopted for fashion and stylistic reasons, or otherwise; use, mounting and dismounting of the device, is inconvenient; the holders themselves are not comfortably held for use of the mounted device; the holders do not enable the mounted device to be presented in desirable, multiple orientations; device size-accommodation is limited; the quality of projected sound may be poor; aesthetic attributes are lacking; etc.

Holders in the form of brackets or rests have of course previously been provided to enable shoulder support of conventional, land-based telephone handsets. Such holders are not adapted however for use in connection with smartphones and other electronic communication devices.

Representative of prior art of a possible interest to the present invention are the following:

| U.S. Publ. ApplIns. | U.S. Utility Patents | U.S. Design Patents | Foreign Patent Docs. |
| --- | --- | --- | --- |
| 2002/009195 | 2,486,438 | D273,677 | DE 1012006005111 A1 |
| 2002/190176 | 5,187,744 | D276,229 | DE 202004006834 U1 |
| 2004/091102 | 5,457,745 | D278,057 | DE 202005002590 U1 |
| 2005/156088 | 5,836,563 | D290,956 | DE 202011051891 U1 |
| 2006/126824 | 6,085,113 | D299,187 | EP 0775609 |
| 2006/183511 | 6,229,891 | D321,186 | FR 2917354 |
| 2007/045495 | 6,285,758 | D367,065 | GB 2438662 |
| 2007/223745 | 6,966,533 | D449,043 | KR 101186441 |
| 2008/268793 | 6,980,836 | D449,831 | KR 101278259 |
| 2008/296332 | 8,412,289 | D453,017 | KR 20050020901 |
| 2009/184145 | 8,428,665 | D548,457 | WO 9857568 |
| 2009/270143 | 8,596,412 | D596,393 | WO 11152597 |
| 2011/000945 | 8,616,327 | D623,651 | WO 12016862 |
| 2011/143583 | | D658,167 | |

| U.S. Publ. ApplIns. | U.S. Utility Patents | U.S. Design Patents | Foreign Patent Docs. |
| --- | --- | --- | --- |
| 2011/163211 | | D676,034 | |
| 2011/183728 | | D678,870 | |
| 2012/024619 | | | |
| 2012/027237 | | | |
| 2012/037783 | | | |
| 2012/235005 | | | |
| 2012/303146 | | | |
| 2012/312936 | | | |
| 2013/048413 | | | |
| 2014/003021 | | | |

Despite the activity in the art indicated by the foregoing, the deficiencies described above have not been adequately addressed or satisfied.

BRIEF SUMMARY OF THE INVENTION

Accordingly it is a broad object of the present invention to provide a holder for a hand-held electronic communication device which is convenient and comfortable to use and which does not require supplemental connectivity.

A more specific object of the invention is to provide such a holder which affords secure support for a smartphone, both on an underlying flat support surface, in portrait and landscape orientations, and also in positions nested in the space between a user's shoulder and head or face.

Another specific object of the invention is to provide such a holder which is of ergonomic construction for comfortable and secure, ambidextrous, hand-held manual use.

A further specific object is to provide a holder that is capable of use for electronic communication devices having a range of sizes and shapes, while also affording quick and facile mounting and dismounting of the device on and from the holder.

An additional specific object of the invention is to provide such a holder from which sound produced by the mounted device is projected effectively and without undue degradation of quality.

A still further object the invention is to provide a holder having the foregoing features and advantages which also affords a high degree of aesthetic appeal.

It has now been found that the foregoing and related objects of the invention are attained by the provision of a holder for the stable support, of a hand-held electronic communication device, comprising: a generally wedge-shaped base that is symmetric about a longitudinal central axis, having an open front, a back, a top, a bottom, and laterally opposite sides; a faceplate, overlying the open front of the base, and having a front surface and a longitudinal axis extending between the top and the bottom of the base and a transverse axis extending between its opposite sides; and retaining means for disengageably mounting a thin, flat, generally rectangular hand-held electronic communication device, optionally contained within a case therefor, in position on the faceplate with a longitudinal axis and a transverse axis of the communication device aligned with the longitudinal axis and transverse axis, respectively, of the faceplate.

The base of the holder has a flat, nonskid back surface thereon constructed for stably supporting the holder both between a user's shoulder and face, and also in a freestanding upright state, in a first angular orientation of the faceplate, on an underlying planar surface of a supporting structure. At least one area of indentation, dimensioned and configured to enable secure manual gripping of the holder, extends about the base at a level intermediate the front and back and along the top and the opposite sides thereof.

The faceplate and the flat back surface of the base lie on planes that intersect at a first angle, having a value of about 25 to 30 degrees, so as to dispose the faceplate at the "first" angle relative to such an underlying planar surface, and with the transverse axis of the faceplate parallel to the underlying surface, in portrait orientation, when the base is so supported thereon by the nonskid back surface. The holder also has a multiplicity of supporting contact elements thereon for stable support in at least one freestanding upright state on such an underlying planar surface. A first plurality, of at least three of the contact elements, lie on a common plane, on one side of the base, that intersects the plane of the faceplate at a second angle, having a value of about 60 to 75 degrees, so as to dispose the faceplate at the "second" angle, relative to such an underlying planar surface and with the longitudinal axis of the faceplate parallel to the underlying surface, in a first landscape orientation, rotated 90° from the portrait orientation. The holder is constructed so as to permit the projection therefrom of sound produced by an electronic communication device mounted by the retaining means, and the holder will usually be symmetrical about its longitudinal centerline to facilitate ambidextrous use.

Normally, a second plurality of at least three of contact elements will lie on a second common plane, on the opposite side of the base, that also intersects the plane of the faceplate at the "second" angle. The faceplate will therefore be disposed at the second angle, relative to such an underlying planar surface and with the longitudinal axis parallel thereto, in a freestanding upright state in a second landscape orientation, the first and second landscape orientations being rotated 180° from one another.

The base of the holder will usually comprise a substantially hollow housing, molded from a synthetic resinous material. A base insert will advantageously be mounted in the bottom wall of the housing to provide the back surface on the base, and may be of such composition as to inherently provide the nonskid property to the back surface. The insert will desirably be weighted so as increase the overall mass of the base and to lower the center of gravity of the holder, in the freestanding upright states thereof. The bottom wall of the housing may be formed with a recess in which the base insert is contained so as to acoustically insulate the insert and avoid undue sound attenuation thereby.

In most instances the holder will include a gasket member attached to, and extending about the periphery of, the faceplate and extending to a height above a forwardmost plane of the faceplate, for direct surface contact with a hand-held electronic communication device so mounted on the holder. The gasket will normally be fabricated from a low durometer, resiliently deformable material having nonskid properties, and it will advantageously be of nonuniform height along its length. Such a nonuniform gasket will form a plurality of gaps between the front surface of the face place and a so-mounted communication device, at locations at which the gasket is low relative to other locations therealong, so as to increase sound projection from the holder.

The faceplate will normally be perforated so as to promote the free passage of sound waves from a so-mounted communication device into the base. In the most preferred embodiments the faceplate will be constructed with parallel, substantially rectilinear margins along top and bottom edges thereof, and substantially concave margins along its opposite lateral edges, with at least projections of the concave margins and the rectilinear margins intersecting to form four corners and to afford an hourglass-like peripheral configuration to the faceplate. Such faceplate corners provide four of the multiplicity of supporting contact elements that are present on the holder.

The retaining means of the holder will usually act to apply clamping force along the longitudinal axis of the faceplate. In preferred embodiments, the retaining means will comprise a coarse-adjustment mechanism that includes a first gripping part and that is operable to selectively position the gripping part for varying the distance over which such clamping force is applied; and a biasing mechanism that includes a second gripping part which is dynamically biased by the biasing mechanism toward the first gripping part to cooperate therewith for clamping a mounted communication device therebetween. A communication device will readily be removed from the holder by the application of force to move the second gripping part longitudinally away from the first gripping part, against biasing force produced by the biasing mechanism.

The coarse-adjustment and biasing mechanisms of the retaining mean will advantageously be carried by the faceplate. Most desirably, the coarse-adjustment mechanism will comprise an upper slide that provides the first gripping part and includes a pair of substantially parallel legs extending into the faceplate. A rotary cam piece will be mounted by the faceplate, and will be constructed to grip and hold the legs in selected positions of extension of the first gripping part away from the faceplate, in at least one angular position of cam piece rotation, and to effect release of the legs in at least a second angular position of rotation. The biasing mechanism employed in such embodiments will desirably comprise a lower slide, providing the second gripping part and including at least one leg extending into the faceplate, and at least one spring, providing biasing means, effectively attached to the lower slide and the faceplate to urge the second gripping part toward the faceplate.

The lower slide will also most desirably be comprised of a pair of substantially parallel legs extending into the faceplate, with a pair of coil springs, mounted upon the legs of the lower slide, providing the biasing means. Both the upper slide and the lower slide will preferably be wire-form slides (albeit plastic construction may be used), each of which comprises a generally U-shaped section, providing a gripping part for engaging a mounted communication device, joining the substantially parallel legs thereof to one another.

The holder will most advantageously be of generally bulbous shape and is substantially symmetrical about a longitudinal centerline to facilitate secure, ambidextrous, hand-held use of the holder. At least one area of indentation will usually be formed on the base to comprise a continuous, elongate, ergonomic concavity extending along the top and the opposite sides of the base, so as to provide thumb and finger ridges to facilitate secure gripping of the holder. The surface of the concavity will preferably be constructed to afford increased frictional resistance and an improved manual grip, as compared to adjacent areas of the holder, such as by overmolding with a low durometer rubber or rubbery material, or applying a separate element having those qualities.

The base may be perforated to promote the free passage of sound therefrom, and in certain embodiments the holder will additionally include an acoustic baffle insert, mounted intermediate the front and back of a substantially hollow housing, for upwardly reflecting sound waves emanating through the faceplate from a so-mounted communication device, and also beneficially providing resonant amplification. Such an acoustic baffle insert will desirably be in the form of an elongate through made of a thin sheet of a synthetic resinous material (e.g., polystyrene or polypropylene), having a longitudinal axis aligned with the longitudinal axis of the faceplate and having a generally U-shaped or W-shaped transverse cross-section.

BRIEF DESCRIPTION OF THE SEVERAL VIEWS OF THE DRAWINGS

FIG. 1 is a perspective view of a holder embodying the present invention.

FIG. 2 is a perspective view of the holder of FIG. 1 with which a hand-held electronic communication device is assembled.

FIG. 3 is a perspective view of the assembly of FIG. 2, held in the hand of a user.

FIG. 4 is a perspective view of the assembly of FIG. 2, supported in the space between the shoulder and head or cheek of a user.

FIG. 9 is a bottom end view of the holder of FIG. 1, as situated in FIG. 6.

FIG. 10 is a top end view of the holder of FIG. 1, as situated in FIG. 6.

FIG. 11 is a front view of the holder of FIG. 1, as situated in FIG. 6.

FIG. 12 is a back view of the holder of FIG. 1.

FIG. 13 is an exploded perspective view of the holder of FIG. 1.

FIG. 14 is a longitudinal sectional view of the holder of FIG. 1, taken along line X-X of FIG. 5.

FIG. 15 is a longitudinal sectional view of a holder, taken along line Y-Y (the central plane) of FIG. 5, with which a smartphone, contained in a case, is assembled.

FIG. 16 is a diagrammatic view of the holder of FIG. 1, from which the front section of the faceplate has been removed to expose internal features, and with the cam knob orientated so as to permit free sliding movement of the clamping member relative to the faceplate.

FIG. 17 is a perspective view of the cam knob that is mounted in the faceplate of the holder, drawn to an enlarged scale.

FIGS. 18A and 18B show, in diametrical cross section taken through the cam knob, the relationships that exist between the cam knob and the clamping member for free sliding movement, as in FIG. 16, and in locking position, respectively.

DETAILED DESCRIPTION OF THE INVENTION

Figure 5:
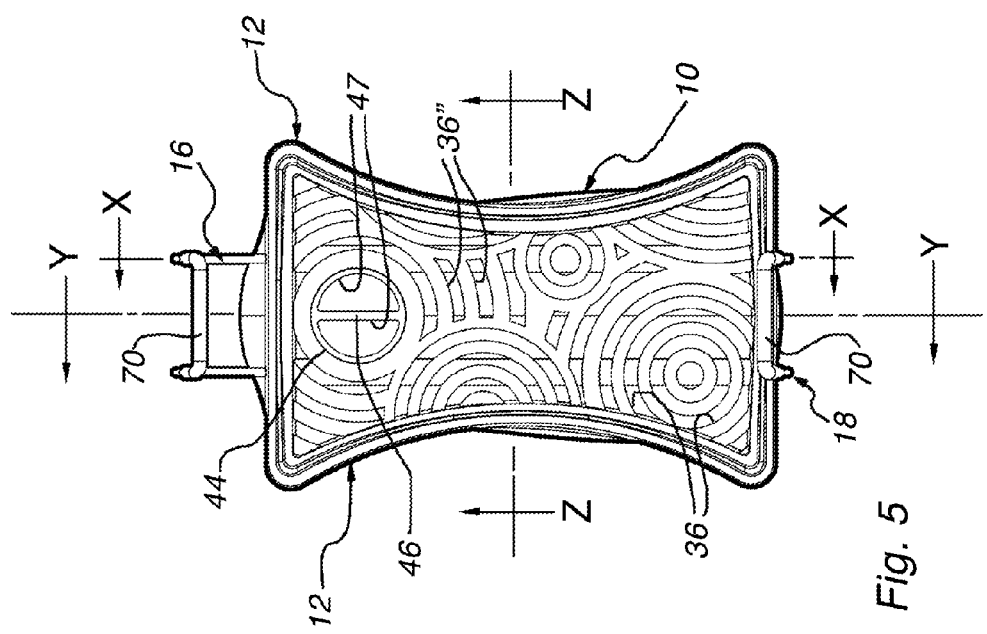
FIG. 5 is front view of the holder of FIG. 1, drawn to a somewhat enlarged scale.

Turning now in detail to the appended drawings, therein illustrated is a holder for a hand-held electronic communication device, embodying the present invention. The holder consists of a generally wedge-shaped, bulbous base, generally designated by the numeral 10, and a faceplate, generally designated by the numeral 12, attached thereto. With the exception of the pattern of holes or perforations in the faceplate 12, the holder is symmetric about a central plane extending along its longitudinal axis (i.e., from top to bottom).

As seen in FIGS. 2 through 4, the device mounts a hand-held electronic communication device in the form of a smartphone, P, which is removeably held in position against the faceplate 12 by the cooperative action of a top wire-form, partially coated, clamping member and a bottom wire-form, partially coated, clamping member, generally designated respectively by the numerals 16 and 18. As depicted in FIG. 2 the holder is supported on a horizontal surface (not shown), with the smartphone P in portrait orientation; as depicted in FIG. 3 the holder is held manually (i.e., in the user's hand); and as depicted in FIG. 4 the holder is supported between the head and shoulder of a user, with the smartphone P positioned effectively to transmit sound to the user's ear while, at the same time, allowing the user's voice to be picked up by the microphone in the contained phone.

The base 10 is shaped ergonomically (as is perhaps best seen in FIGS. 1, 2, and 6), with a recess or channel 20 that extends continuously and symmetrically along the opposite sides and the across the top of the base 10, for palm-rest support and to receive the thumb and fingers of a user, and is bounded by integral, gentle ridge-like structures 14 to enhance the security of gripping. In preferred embodiments channel 20 will have a surface having a high coefficient of friction. A suitable element may be molded separately from the housing components, using a relatively soft, rubber-like material, and subsequently affixed; or it may be over-molded in an operation in which the softer grip material fuses to the harder material from which the base housing is fabricated. An attached anti-skid base insert 22 protrudes from the back of the base 10, to enhance the positional stability of the holder, both while supported upon a user's shoulder and also while lying upon the surface of an underlying structure. The insert 22 will normally be comprised of a natural or synthetic rubber or rubber-like material of low durometer value (e.g., an elastomeric thermoplastic), so as to inherently provide anti-skid, friction or drag-producing properties to its bottom surface; such a material will also increase hand-held tactile comfort. In addition, the insert will usually be relatively heavy so as to lower the center of gravity of the base and thereby increase the stability of the holder, especially when it is in an upright position; the effect may be augmented by incorporating weighting elements (e.g., metal pieces or a metal core, see FIG. 15) within the insert. As seen in FIG. 10, a pin 32 extends laterally in a recess 32 formed into the top of base 10, and serves for attachment of a strap, lanyard, or other means for conveniently carrying the holder when it is not in use.

Figure 6:
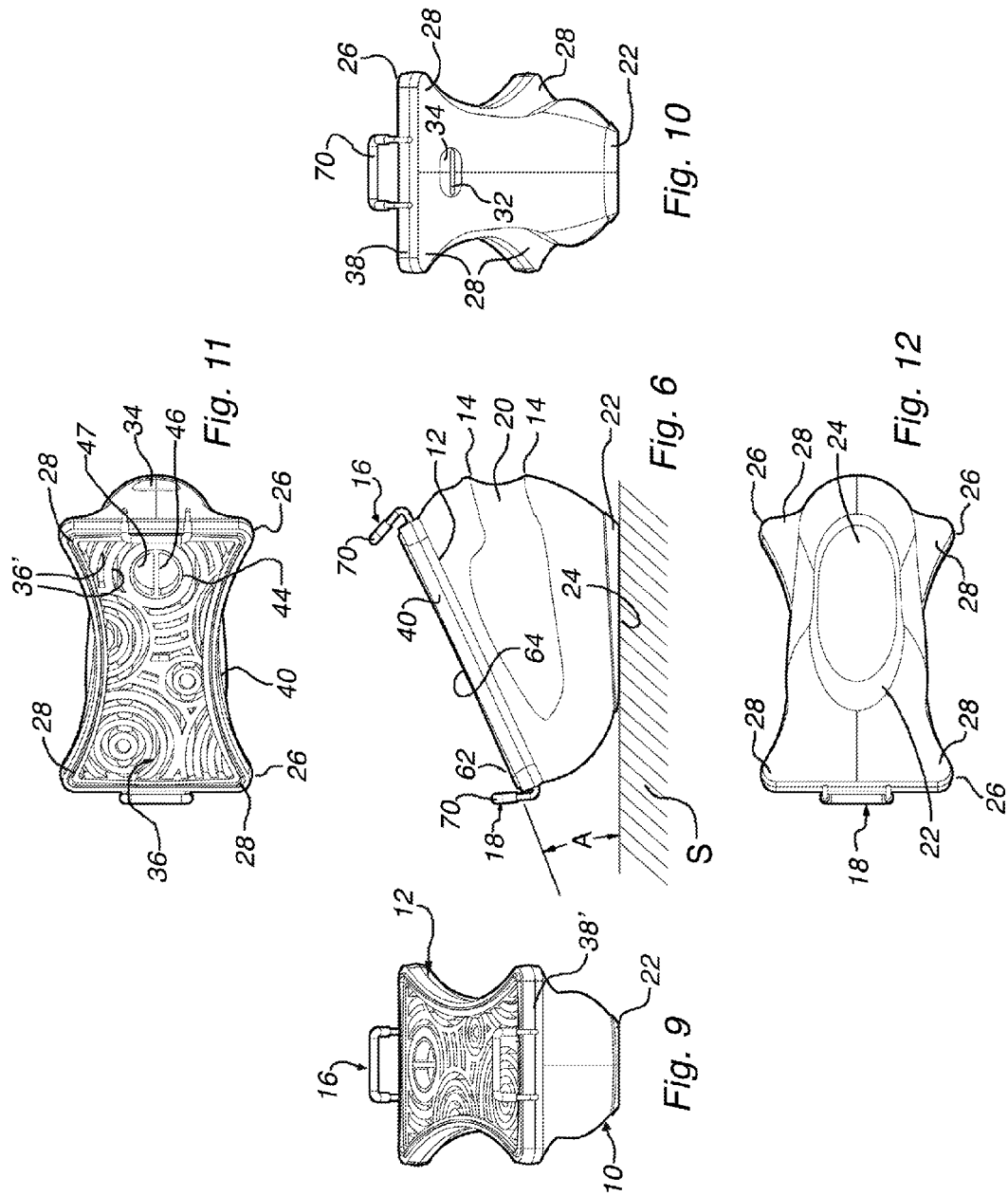
FIG. 6 is a side elevational view of the holder of FIG. 1, resting upon a horizontal support surface in portrait orientation.

FIG. 6 depicts the holder lying upon a support structure, with the bottom surface 24 of the base insert 22 in direct contact with the underlying surface S. As so positioned, a mounted communication device would be displayed in portrait orientation, with the plane of the faceplate 12 forming an angle A with the supporting surface S. Typically the angle A will have a value of about 20° to 35°, and preferably about 25° to 30°, the value being about 26° in the illustrated embodiment.

Figure 7:
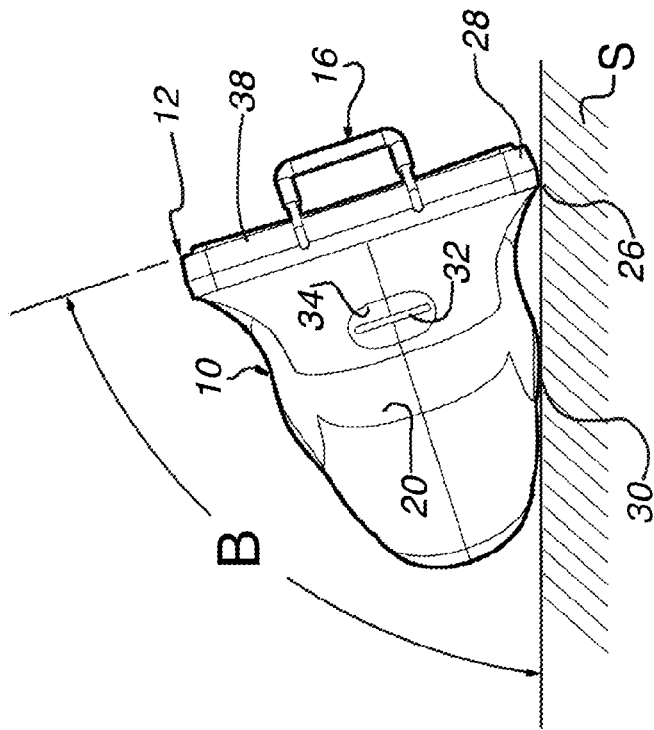
FIG. 7 is an elevational view of the holder of FIG. 1, taken from the top end of the holder and resting upon a horizontal support surface, in landscape orientation.
Figure 8:
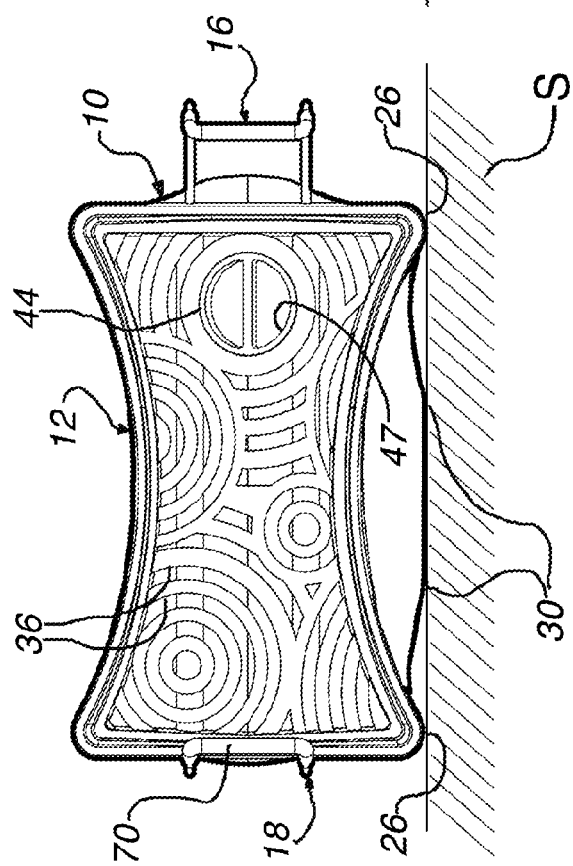
FIG. 8 is a front view of the holder in the landscape orientation of FIG. 7.

FIG. 7 is a view of the holder of the foregoing figures supported on one side, in landscape orientation of a mounted communication device, so as to rest on contact elements 26, provided by corners 28 of the base plate 12, and contact elements 30 on the base 10. It will be appreciated that the holder may be supported in the same way on its opposite side, in a second (i.e., 180° rotated) landscape orientation. As so displayed the common plane on which the contact elements 26, 30 lie forms an angle B with plane of the faceplate 12. The angle B will typically have a value of 60° to 75°; as depicted in FIG. 7, the angle has a value of about 72°.

The faceplate 12 is flat, thin, and generally rectangular, having rectilinear top and bottom margins 38, 38' but deviating from true rectangularity by reason of lateral margins 40 that are arcuately indented, and of concave contour, to impart an hourglass-like configuration to the faceplate 12. As will be appreciated, this configuration provides the rounded, acute angle corners 28 which, in turn, provide contact elements 26. The spacing from an underlying supporting surface, resulting from the concavity of the margins 40, promotes forward projection of sound waves emanating from behind a mounted device and, in instances in which the corners extend beyond the margins of a mounted device, exposed perforations in the faceplate also contribute to forward sound projection. The configuration contributes to the ergonomic character of the holder as well, and may afford an improved grip, particularly when the user's fingers are long.

The faceplate 12 is formed with a pattern of holes or perforations, such as are designated, for example, 36, 36', 36" in FIG. 1. It will be appreciated that the pattern of perforations is arbitrary and may take virtually any form, which form may be designed so as to import a desirable aesthetic feature to the faceplate. Needless to say, however, perforations such as 36, 36', 36" serve important acoustic functions in the holder, facilitating the transmission of sound from speakers incorporated in the mounted device P, which are often directed outwardly from the back of the device (albeit they may be provided elsewhere, such as on the front and/or along an edge); the perforations also permit sound waves directed into the base housing, and reflected, to exit from the front.

A circular hole 42 is formed through the faceplate 12, near its top end and on the longitudinal centerline of the base 10, and a cam knob 44 is rotatably mounted in the hole 42 for a purpose to be described below. Mounting may be effected, for example, by snapping the knob 44 into the faceplate from the underside, such as by providing three equidistantly spaced interference wedges molded into the bottom edge surrounding the hole 42, or by trapping it between a secondary, underlying mounting plate and the faceplate. It will be noted that the knob 44 has a diametrically extending operating handle 46, to the opposite sides of which are formed semicircular apertures 47; apertures 47 also serve to facilitate the transmission of sound through that area of the faceplate 12.

As seen in FIG. 13, the base 10 of the holder is fabricated as two molded pieces, or sections, 48A, 48B, which are of mirror image construction and are joined at the longitudinal centerline of the base 10 to form a hollow housing. Joinder may be effected by fusion, if the material of fabrication is a thermoplastic resin, by adhesive bonding, by mechanical interengagement, and/or any other suitable means. Typically, styrene, polypropylene, polyethylene, ABS, or other hard, rigid synthetic resinous materials will be used for fabrication of the housing.

An upstanding flange 50 extends on the periphery of each housing section 48A, 48B to circumscribe an open top when the sections are joined to one another, and bottom flanges 52 cooperatively circumscribe a straight-sided oval opening 54 in the base 10. The anti-skid base insert 22 is correspondingly formed with a circumferential groove 56, in which the bottom flanges 52 seat to mount the insert 22 within the opening 54.

As best seen in FIGS. 14 and 15, the faceplate 12 is formed with a peripheral flange or lip 58, which mates with the peripheral flanges 50 of the base 10 for secure interengagement of the two components. It will be appreciated that this assembly may also be joined adhesively, thermally, mechanically, or by any other suitable means.

Figure 24:
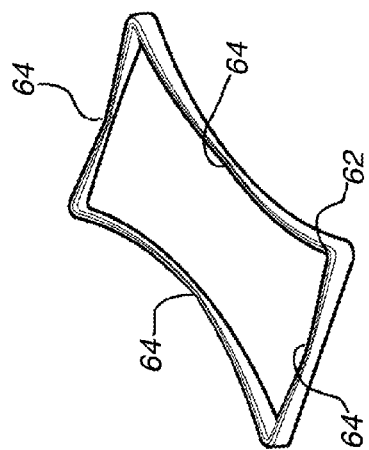
FIG. 24 is a perspective view, drawn to an enlarged scale, depicting a peripheral gasket utilized in the faceplate of certain embodiments, being of gradually varying height along its length.

A peripheral grove 60 surrounds the front of the faceplate 12, and serves to seat a resilient gasket 62. As best seen in FIGS. 6, 13, and 24, the height of the gasket 62 varies gradually along its length, providing sections with low points at 64. The low sections produce gaps at the back of a mounted smartphone, or other device P, and serve to promote and facilitate the propagation of sound outwardly from thereunder.

The top clamping member 16, referred to above, is formed with a pair of parallel legs 66 and a connecting U-shaped section 68, which is covered by a resilient protective element 70 (e.g., of latex or another rubbery material). As is best seen in FIG. 14, the faceplate 12 is formed to have a pair of parallel bores 78 (only one of which is visible in the figure) extending inwardly from the top, each receiving one of the legs 66 in slidable relationship. Although not shown, each leg may have a right-angle finger at its inner and to provide a maximum-extension stop point.

As is best seen in FIG. 17, the cam knob 44 is formed with a pair of long notches 80 (only one of which is visible in this figure), which extend secantally on directly opposite sides of its peripheral (cylindrical) surface, with full diameter areas 82 (or at least shallower grooves) extending generally circumferentially between the notches 80. The circular aperture 42 in the faceplate 12 intersects both of the bores 78 and thus permits engagement of the knob 44 with the legs 66. As depicted in FIGS. 16 and 18A, the knob 44 may be oriented so as to permit free sliding movement of the legs 66 in the bores 78, thereby enabling facile adjustment of the position of the U-shaped section 68 in spaced relationship to the faceplate 12. As seen in FIG. 18B, the knob 44 has been rotated (e.g., through a half-turn, in either direction, from the orientation shown in FIG. 16) so as to present the relatively shallow grooves or full-diameter areas 82 to legs 66, thereby locking them in any selected position throughout the range of extension of the clamping member 16 from the faceplate 12. The knob may be provided with antiskid rubber inserts on leg-engaging surfaces so as to increase the locking effect, for which purpose the legs may also be knurled or textured. Detent elements may be incorporated to provide tactile feedback, and a visual scale may correlate to particular communication devices to indicate optimal force-related clamping positions.

The bottom clamping member 18 is also formed with parallel legs 72 connected by a protectively covered U-shaped section 68. The free end of each of the legs 72 however carries a stop-element 74, and a coil spring 76 is disposed on each leg 72.

With reference again to FIG. 14, it is seen that a second pair of parallel bores 84 (only one bore again being visible in the figure) extend inwardly from the bottom end of the faceplate 12 and slidably receive the parallel legs 72 of the bottom clamping member 18. An elongate slot or recess 86 is formed into the back of the faceplate, at the inner end of each bore 84, and serves to receive the coil spring 76 mounted on the inner portion of each leg 72. The spring 76 bears at one end upon the stop element 74 of the respective leg 72, and at the opposite end upon the adjacent bearing surface 88 of the faceplate formed at the intersection of the slot 86 and bore 84. The springs 76 bias the bottom clamping member 18 toward the faceplate 12 and the top clamping member 16.

Thus, as seen for example in FIG. 15, a smartphone P is clamped in position, above the faceplate 12 (i.e., with the gasket 62 interposed), by the cooperative action of the clamping members 16, 18. Variation of the spacing between those members is achieved, to accommodate communication devices of a range of different lengths, by extending the top clamping member 16 an appropriate distance away from the faceplate 12, and locking it in that position by operation of the cam knob 44 (turning it in either clockwise or counterclockwise) so as to establish the relationship depicted in FIGS. 2, 3, etc. The tension applied by the springs 76 causes bottom clamping member 18 to dynamically cooperate with top clamping member to maintain the device in position, but the member 18 may readily be extended, against the force of the springs, so as to release and dismount the smartphone quickly and conveniently, when so desired; needless to say, the smartphone is readily replaced.

It will be appreciated that the peripheral gasket 62 serves not only to cushion a smartphone P mounted on the faceplate 12 but also to produce a frictional restraint against movement, and undue displacement, of the smartphone relative to the holder. As noted above, moreover, the gasket 62 is formed so as to permit sound propagation from a rear-mounted speaker 100 in both lateral and transverse directions.

FIG. 15 diagrammatically simulates the forward and rearward progression of sound waves emanating (upwardly curved waves) from speakers 100 installed in the back of a smartphone P, and reflected (downwardly curved waves) by internal structure. In the illustrated embodiment the smartphone is contained in a case 96, which is formed with apertures 98 to permit the unattenuated passage of sound. As can be seen, sound waves enter the chamber 99 of the housing, comprised of molded sections 48A' (not shown) and 48B' (which differ from the sections 48A and 48B previously described in providing sidewall and top wall elements 92, 94, respectively). The elements 92, 94 define a supplemental compartment 90 for the containment of an anti-skid base insert 22', the form of which is also modified somewhat from that of the insert 22 previously described; insert 22' also contains a weight 23 (shown in phantom line) for lowering the center of gravity of the holder. It will be appreciated that the top wall 94 presents a relatively smooth, hard surface, that reflects sound waves upwardly through the chamber 99 and acoustically isolates the base insert 22' so as to reduce any sound-damping effect that it might have. As noted above, inserts 22, 22' will normally be made of a resilient, low durometer rubber-like material (albeit they may for example be made of a sound-reflecting material having a friction-producing element or layer on the bottom), which would tend to absorb and damp, rather than reflect, sound waves and thereby diminish acoustic quality.

Figure 19:
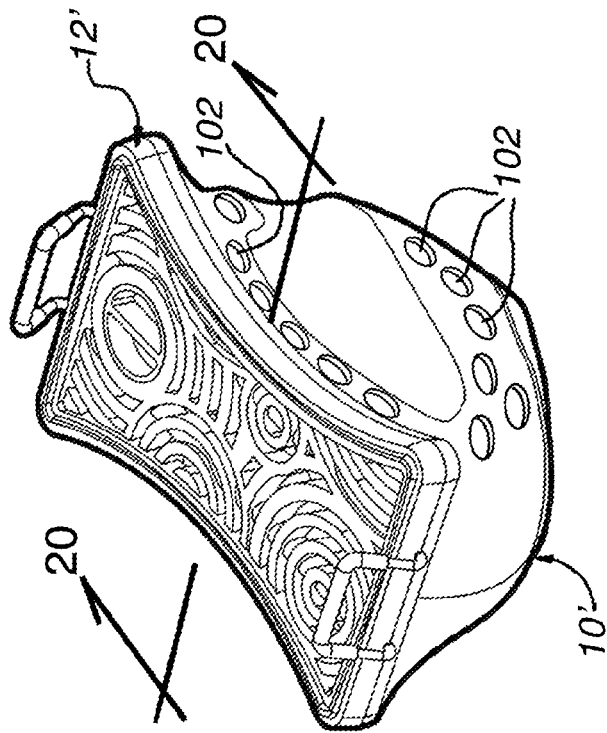
FIG. 19 is a view similar to that of FIG. 1, showing the faceplate attached to modified form of the holder base.
Figure 20:
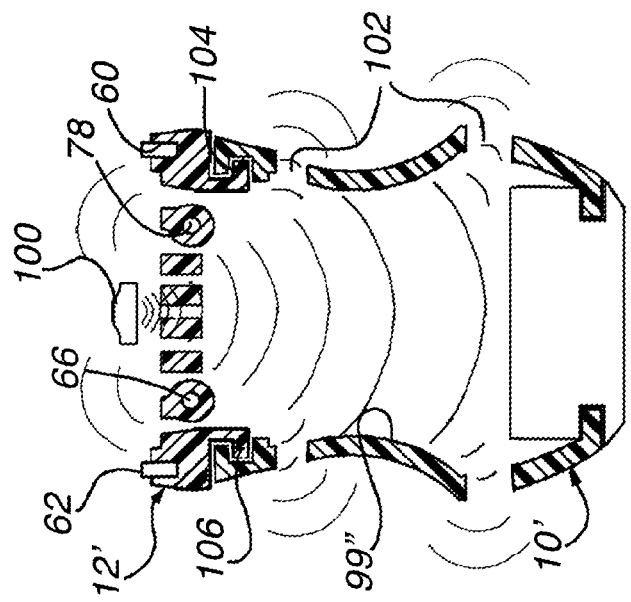
FIG. 20 is a sectional view of the holder of FIG. 19, taken along line 20-20 of FIG. 19 and depicting a loudspeaker positioned in one of many possible positions in relation to the faceplate.

Turning now to FIGS. 19 and 20, it will be seen that in this embodiment the sides of the housing, comprising the base 10', are formed with a number of holes 102. Holes may be provided elsewhere in the base and, indeed, the base insert may be perforated to permit free sound transmission therethrough. FIG. 20 simulates the propagation of sound waves from the speaker 100 into the chamber 99'', and projection outwardly through the holes 102.

FIG. 20 also shows the attachment of a faceplate 12' to the base 10' by the interengagement of a peripheral flange 106 on the faceplate in a mating peripheral channel 104 that extends about the front opening into the base 10'; assembly is conveniently effected as the housing pieces are joined to one another during manufacture. A snap-fit interengagement may alternatively be enabled, however, by beveling the lower edge of the flange 106 (or by use of analogous structural features), so as to facilitate it being pressed into the top opening of an assembled housing and becoming engaged in the channel 104.

Figure 23:
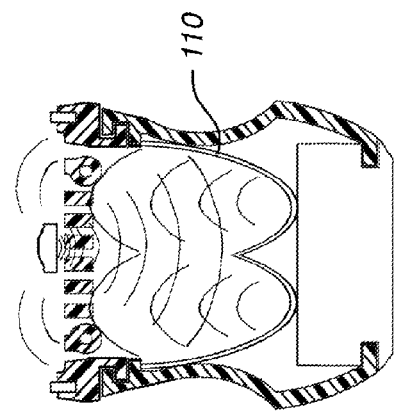
FIG. 23 is a view similar to that of FIG. 21 but with the holder modified to contain a W-shaped sound-reflecting insert.
Figure 22:
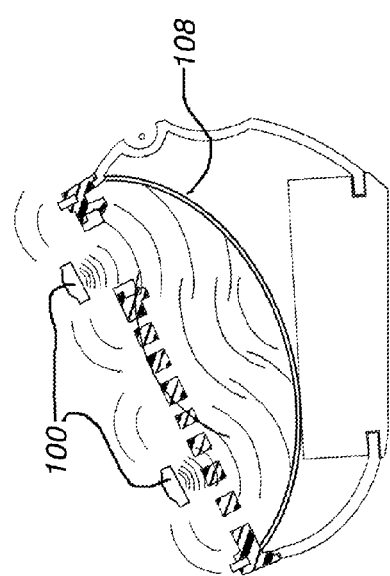
FIGS. 21 and 22 are cross sectional views, taken along lines Z-Z and Y-Y, respectively, of the holder as shown in FIG. 5, modified to contain a U-shaped sound-reflecting insert.
Figure 21:
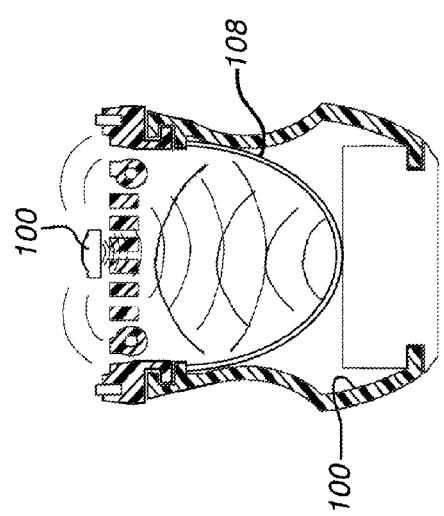

As depicted in FIGS. 21 and 22, a supplemental, tub-shaped, sound-reflecting insert 108 may be installed within the chamber 99 of the housing for reflecting sound emanating from the speaker 100, and for thereby improving the acoustic qualities of the unit. FIG. 23 shows an alternative form of such a sound-reflecting insert having a W-shaped cross section rather than the U-shaped cross section depicted in FIG. 21. If of suitable structure (e.g., a very thin sheet of a vacuum-formed plastic, such as polypropylene or polystyrene), the baffle may also function to produce a resonant response to, and thereby for amplification of, impinging sound waves.

Figure 25:
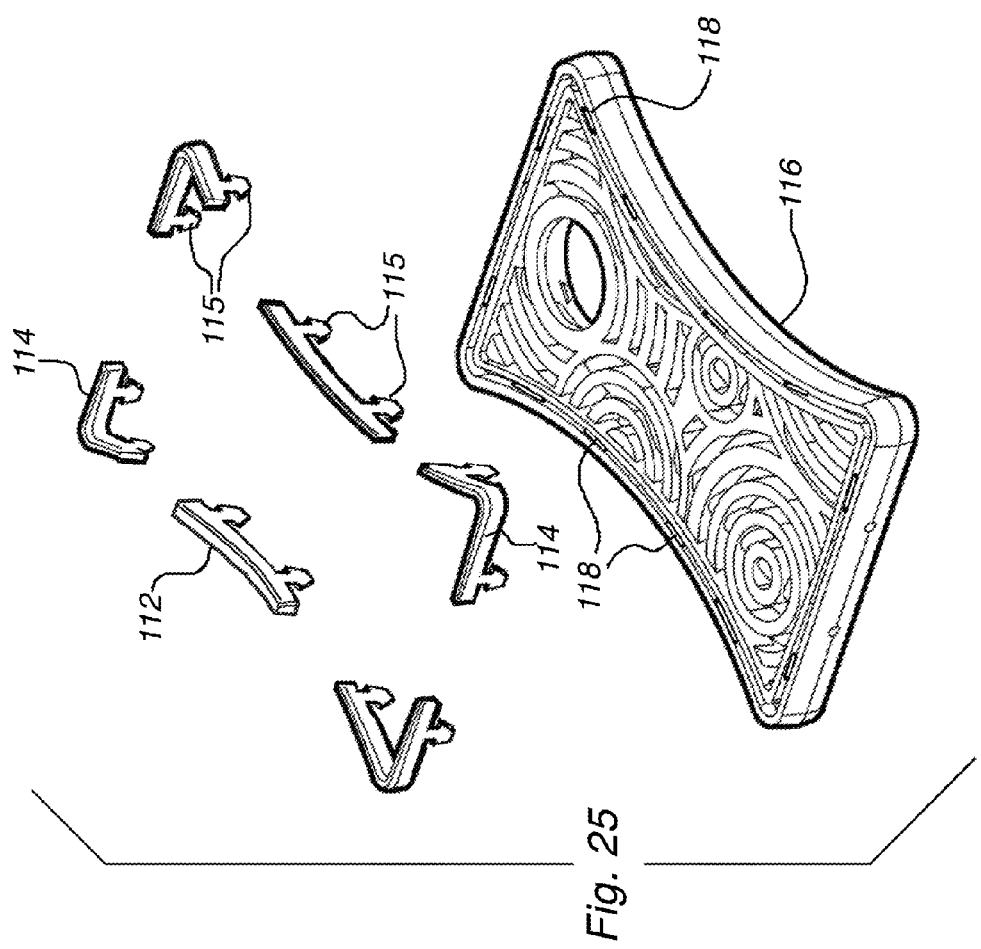
FIG. 25 is an exploded perspective view, drawn to an enlarged scale, depicting a segmented form of gasket, and a faceplate to which it is attached when assembled.

Turning finally to FIG. 25, a form of peripheral faceplate gasket, that provides an alternative to the gasket depicted in FIG. 24, consists of lateral elements 112 and corner elements 114, each of which elements is provided with a pair of bayonet tabs 115. Correspondingly, the faceplate 116 is formed with a series of long apertures 118 in its margins, which are dimensioned and configured to receive the arrowhead elements of the tabs 115 (with some compressive deformation) and thereby to engage the gasket elements 112, 114 in fixed positions when the heads resume their normal, relaxed shape. Because the elements 112, 114 are spaced from one another, in a peripheral sense, as so attached to the faceplate 116, sounds emanating from a mounted device can readily project laterally and transversely through the gaps that exist between the gasket elements.

It will be appreciated by those skilled in the art that many variations may be made in the present holder and its features without departure from the scope of the appended claims. For example, while an hourglass-like faceplate is the preferred form, the faceplate may be more truly rectangular or of other suitable configurations. Clamping mechanisms other that that which is described may be employed, and may act on a transverse rather than a longitudinal axis, if preferred (while transversely disposed gripping elements might unduly interfere with landscape orientations on a supporting surface, they would also permit a larger angle of tilt in the portrait orientation by resting on a bottom edge of the faceplate of a mounted device); indeed, the clamping means may be mounted in or on the base of the holder rather than the faceplate, if so desired. The configuration of the base and the structure of a base housing may also deviate from those described, and suitable alternative ergonomic shapes and features may occur to those skilled in the art, based upon the foregoing disclosure; certainly, aesthetics (such as may be achieved by selected patterns of faceplate perforations, contrasting shapes and colors of inserts and overmoldings, etc.) may vary. Faceplate gaskets, internal acoustic baffles and resonators, etc., of different forms and structure may be envisioned by skilled persons as well, and the placement and nature of indentations or concave channels for secure gripping may take different forms and shapes and surfaces may be embossed or otherwise textured for enhanced gripping capability. Finally, as noted above, the holder of the invention may be utilized for mounting electronic communication devices other than smartphones, such as mobile phones, portable media players, tablets, personal digital assistants, e-book readers, computers, etc. In some instances the mounted device may extend beyond the periphery of the faceplate, and/or the angular relationships of pertinent parts may be such that support elements on the faceplate become inaccessible, or ineffective; in those cases the device, securely mounted on the holder, may itself provide elements or surfaces for supporting the assembly in desired orientations (for example, if a wide electronic tablet is mounted on the holder the viewing angle could be in the range of about 45° to 72°). It will be appreciated that, when the speakers for the mounted device are located on the front or, as is commonly the case, on an edge of the device, acoustic benefits of the holder will be limited, or indeed precluded, without of course compromising its other features and advantages.

Thus, it can be seen that the present invention provides a holder for a hand-held electronic communication device that is convenient and effective to use. The holder is constructed for comfortable and secure, ambidextrous, hand-held manual use, and it affords secure support for a hand-held electronic communication device both on an underlying flat support surface, in portrait and landscape orientations, and also in positions nested in the space between a user's shoulder and head or face. The holder is capable of use for electronic communication devices having a range of sizes and shapes, while also affording quick and facile mounting and dismounting of the device on and from the holder. Sound produced by the mounted device is projected from the holder effectively and without undue degradation of quality, and the holder may afford a high degree of aesthetic appeal.

Having thus described the invention, what is claimed is:

1. A holder for the stable support, upon a user's shoulder and upon an underlying planar surface in at least two orientations, of a hand-held electronic communication device, comprising:
    a generally wedge-shaped base that is symmetric about a longitudinal central axis, having an open front, a back, a top, a bottom, and laterally opposite sides;
    a faceplate, overlying said open front of said base, having a front surface and a longitudinal axis extending between said top and said bottom of said base and a transverse axis extending between said opposite sides of said base; and
    retaining means for disengageably mounting a thin, flat, generally rectangular hand-held electronic communication device, optionally contained within a case therefor, in position on said faceplate with a longitudinal axis and a transverse axis of the communication device aligned with the longitudinal axis and transverse axis, respectively, of said faceplate;
    said base having a flat, nonskid back surface thereon constructed for stably supporting said holder both between a user's shoulder and face and also in a freestanding upright state, in a first angular orientation of said faceplate, on an underlying planar surface of a supporting structure, said base having at least one area of indentation, at a level intermediate said front and back and along said top and said opposite sides thereof, dimensioned and configured to enable secure, hand-held manual gripping of said holder;
    said faceplate and said flat back surface of said base lying on planes that intersect at a first angle, having a value of about 25 to 30 degrees, so as to dispose said faceplate at said first angle relative to such an underlying planar surface, and with said transverse axis of said faceplate parallel to the underlying surface, in portrait orientation, when said base is so supported thereon by said nonskid back surface;
    said holder also having a multiplicity of supporting contact elements thereon for stably supporting said holder in at least one freestanding upright state on such an underlying planar surface, a first plurality of at least three of said contact elements lying on a common plane, on one side of said base, that intersects the plane of said faceplate at a second angle, having a value of about 60 to 75 degrees, so as to dispose said faceplate at said second angle, relative to such an underlying planar surface and with said longitudinal axis of said faceplate parallel to the underlying surface, in a first landscape orientation, when said base is so supported by said first plurality of said contact elements, said first landscape orientation being rotated 90° from said portrait orientation; and
    said holder being so constructed as to permit the projection therefrom of sound produced by an electronic communication device so mounted by said retaining means.

2. The holder of claim 1 wherein a second plurality of at least three of said contact elements lie on a second common plane, on the opposite side of said base, that intersects said plane of said faceplate at said second angle so as to dispose said faceplate at said second angle, relative to such an underlying planar surface and with said longitudinal axis parallel thereto, in a freestanding upright state in a second landscape orientation, when said base is so supported by said second plurality of said contact elements on the underlying surface, said first and second landscape orientations being rotated 180° from one another.

3. The holder of claim 1 wherein said base comprises a substantially hollow housing, molded from a synthetic resinous material, and a base insert mounted in a bottom wall of said housing, said base insert providing said back surface on said base and being of such composition as to inherently provide said nonskid property to said back surface.

4. The holder of claim 3 wherein said base insert is weighted so as to increase the overall mass of said base and to lower the center of gravity of said holder in said freestanding upright states thereof.

5. The holder of claim 1 wherein said bottom wall of said housing is formed with a recess, and wherein said base insert is contained in said recess of said housing so as to acoustically insulate said base insert and avoid undue sound attenuation thereby.

6. The holder of claim 1 wherein said open front of said base is surrounded by an upper peripheral edge upon which said faceplate is disposed.

7. The holder of claim 6 additionally including a gasket member attached to said faceplate and extending about the periphery of said faceplate and to a height above a forwardmost plane thereof, for direct surface contact with a hand-held electronic communication device so mounted on said holder.

8. The holder of claim 7 wherein said gasket is fabricated from a low durometer, resiliently deformable material having nonskid properties.

9. The holder of claim 7 wherein said gasket is of nonuniform height along its length so as to form a plurality of gaps, between said front surface of said face place and a so-mounted communication device, at locations at which said gasket is low relative to other locations therealong, so as to increase sound projection out of said holder.

10. The holder of claim 1 wherein said faceplate is perforated to enable the free passage of sound from a so-mounted communication device into said base.

11. The holder of claim 10 wherein said base comprises a substantially hollow housing, and wherein said holder additionally includes an acoustic baffle insert mounted intermediate said front and back of said housing for upwardly reflecting sound waves emanating through said faceplate from a so-mounted communication device.

12. The holder of claim 11 wherein said acoustic baffle insert is in the form of an elongate through having a longitudinal axis aligned with said longitudinal axis of said face plate, and having a generally U-shaped or W-shaped transverse cross section.

13. The holder of claim 1 wherein said faceplate has parallel, substantially rectilinear margins along top and bottom edges thereof, and substantially concave margins along opposite lateral edges thereof, said concave margins substantially intersecting said rectilinear margins to form four corners on said faceplate, said corners providing four of said multiplicity of supporting contact elements on said holder.

14. The holder of claim 1 wherein said retaining means acts to apply clamping force along said longitudinal axis of said faceplate.

15. The holder of claim 14 wherein said retaining means comprises a coarse-adjustment mechanism that includes a first gripping part, and being operable to selectively position said first gripping part for varying the distance over which such clamping force is applied.

16. The holder of claim 15 wherein said retaining means further comprises a biasing mechanism that includes a second gripping part that is biased by said biasing mechanism toward said first gripping part to cooperate therewith for clamping a mounted communication device therebetween, the communication device being readily removed from said holder by the application of force to move said second part longitudinally away from said first part against biasing force produced by said biasing mechanism.

17. The holder of claim 15 wherein said coarse-adjustment and biasing mechanisms are carried by said faceplate;
wherein said coarse-adjustment mechanism comprises an upper slide providing said first gripping part and including a pair of substantially parallel legs extending into said faceplate, and a rotary cam piece mounted by said faceplate and being constructed to grip and hold said legs in selected positions of extension of said first gripping part away from said faceplate, in at least one angular position of rotation of said cam piece, and to effect release of said legs in at least a second angular position of rotation of said cam piece; and
wherein said biasing mechanism comprises a lower slide providing said second gripping part and including at least one leg extending into said faceplate and at least one spring providing biasing means effectively attached to said lower slide and said faceplate to urge said second gripping part toward said faceplate.

18. The holder of claim 17 wherein said lower slide is comprised of a pair of substantially parallel legs extending into said faceplate, and wherein a pair of coil springs, mounted upon said legs of said lower slide, provide said biasing means.

19. The holder of claim 18 wherein said upper slide and said lower slide are both wire-form slides, and wherein each of said slides comprises a generally U-shaped section, for engaging a so-mounted communication device, joining said substantially parallel legs thereof to one another.

20. The holder of claim 1 wherein said holder is of generally bulbous shape.

21. The holder of claim 1 wherein said at least one area of indentation on said base comprises a continuous, elongate, ergonomic concavity extending along said top and said opposite sides of said base and providing thumb and finger ridges to facilitate secure, hand-held manual gripping of said holder.

22. The holder of claim 21 wherein the surface of said concavity is constructed to afford increased frictional resistance and an improved hand-held manual grip, as compared to adjacent areas of said holder.

23. The holder of claim 22 wherein said surface of said concavity is provided by a low-durometer synthetic resinous material.

24. The holder of claim 1 wherein said base is perforated to promote the free passage of sound therefrom.

25. A holder for the stable support, upon a user's shoulder and upon an underlying planar surface in at least two orientations, of a hand-held electronic communication device, comprising:
a generally wedge-shaped base that is symmetric about a longitudinal central axis, having an open front, a back, a top, a bottom, and laterally opposite sides;
a faceplate, overlying said open front of said base, having a front surface and a longitudinal axis extending between said top and said bottom of said base and a transverse axis extending between said opposite sides of said base; and
retaining means for disengageably mounting a thin, flat, generally rectangular hand-held electronic communication device, optionally contained within a case therefor, in position on said faceplate with a longitudinal axis and a transverse axis of the communication device aligned with the longitudinal axis and transverse axis, respectively, of said faceplate, said retaining means acting to apply clamping force along said longitudinal axis of said faceplate and comprising a coarse-adjustment mechanism that includes a first gripping part, and being operable to selectively position said first gripping part for varying the distance over which such clamping force is applied, and a biasing mechanism that includes a second gripping part that is biased by said biasing mechanism toward said first gripping part to cooperate therewith for clamping a mounted communication device therebetween, the communication device being readily removed from said holder by the application of force to move said second part longitudinally away from said first part against biasing force produced by said biasing mechanism;
said base having a flat, nonskid back surface thereon constructed for stably supporting said holder both between a user's shoulder and face and also in a freestanding upright state; and
said holder being so constructed as to permit the projection therefrom of sound produced by an electronic communication device so mounted by said retaining means.

26. The holder of claim 25 wherein said coarse-adjustment and biasing mechanisms are carried by said faceplate; wherein said coarse-adjustment mechanism comprises an upper slide providing said first gripping part and including a pair of substantially parallel legs extending into said faceplate, and a rotary cam piece mounted by said faceplate and being constructed to grip and hold said legs in selected positions of extension of said first gripping part away from said faceplate, in at least one angular position of rotation of said cam piece, and to effect release of said legs in at least a second angular position of rotation of said cam piece; and wherein said biasing mechanism comprises a lower slide providing said second gripping part and including at least one leg extending into said faceplate and at least one spring providing biasing means effectively attached to said lower slide and said faceplate to urge said second gripping part toward said faceplate.

27. A holder for the stable support, upon a user's shoulder and upon an underlying planar surface in at least two orientations, of a hand-held electronic communication device, comprising:
- a generally wedge-shaped base that is symmetric about a longitudinally extending central axis, comprising a substantially hollow housing and having an open front, a back, a top, a bottom, and laterally opposite sides;
- a perforated faceplate overlying said open front of said base;
- retaining means for disengageably mounting a thin, flat, generally rectangular hand-held electronic communication device, optionally contained within a case therefor, in position on said faceplate, said faceplate being perforated to enable the free passage of sound from a so-mounted device into said base; and
- an acoustic baffle insert mounted intermediate said front and back of said housing for upwardly reflecting sound waves emanating through said faceplate from a so-mounted communication device.

28. The holder of claim 27 wherein said acoustic baffle insert is in the form of an elongate through having a generally U-shaped or W-shaped transverse cross section.

29. A holder for the stable support, upon a user's shoulder and upon an underlying planar surface in at least two orientations, of a hand-held electronic communication device, comprising:
- a generally wedge-shaped, bulbous base that is symmetric about a longitudinally extending central axis, comprising a substantially hollow housing and having an open front, a back, a top, a bottom, and laterally opposite sides;
- a perforated faceplate, overlying said open front of said base, having a front surface and a longitudinal axis extending between said top and said bottom of said base and a transverse axis extending between said opposite sides of said base;
- retaining means for disengageably mounting a thin, flat, generally rectangular hand-held electronic communication device, optionally contained within a case therefor, in position on said faceplate with a longitudinal axis and a transverse axis of the communication device aligned with the longitudinal axis and transverse axis, respectively, of said faceplate, said retaining means acting to apply clamping force along said longitudinal axis of said faceplate and comprising a coarse-adjustment mechanism that includes a first gripping part, and being operable to selectively position said first gripping part for varying the distance over which such clamping force is applied, and a biasing mechanism that includes a second gripping part that is biased by said biasing mechanism toward said first gripping part to cooperate therewith for clamping a mounted communication device therebetween, the communication device being readily removed from said holder by the application of force to move said second part longitudinally away from said first part against biasing force produced by said biasing mechanism; and
- an acoustic baffle insert mounted intermediate said front and back of said housing for upwardly reflecting sound waves emanating through said faceplate from a so-mounted communication device;
- said base having a flat, nonskid back surface thereon constructed for stably supporting said holder both between a user's shoulder and face and also in a freestanding upright state, in a first angular orientation of said faceplate, on an underlying planar surface of a supporting structure, said base having at least one area of indentation, at a level intermediate said front and back and along said top and said opposite sides thereof, dimensioned and configured to enable secure, hand-held manual gripping of said holder;
- said faceplate and said flat back surface of said base lying on planes that intersect at a first angle, having a value of about 25 to 30 degrees, so as to dispose said faceplate at said first angle relative to such an underlying planar surface, and with said transverse axis of said faceplate parallel to the underlying surface, in portrait orientation, when said base is so supported thereon by said nonskid back surface;
- said holder also having a multiplicity of supporting contact elements thereon for stably supporting said holder in at least one freestanding upright state on such an underlying planar surface, a first plurality of at least three of said contact elements lying on a common plane, on one side of said base, that intersects the plane of said faceplate at a second angle, having a value of about 60 to 75 degrees, so as to dispose said faceplate at said second angle, relative to such an underlying planar surface and with said longitudinal axis of said faceplate parallel to the underlying surface, in a first landscape orientation, when said base is so supported by said first plurality of said contact elements, said first landscape orientation being rotated 90° from said portrait orientation; and
- said holder being so constructed as to permit the projection therefrom of sound produced by an electronic communication device so mounted by said retaining means.

* * * * *